United States Patent
Yan et al.

(10) Patent No.: US 9,531,507 B2
(45) Date of Patent: Dec. 27, 2016

(54) ENHANCED TDD UL HARQ TIMELINE FOR UL-DL COEXISTENCE SCENARIO

(75) Inventors: Yu Yu Yan, Beijing (CN); Peter Skov, Beijing (CN); Li Zhang, Beijing (CN)

(73) Assignee: Nokia Solutions and Networks Oy, Espoo (FI)

(*) Notice: Subject to any disclaimer, the term of this patent is extended or adjusted under 35 U.S.C. 154(b) by 19 days.

(21) Appl. No.: 14/419,349

(22) PCT Filed: Aug. 3, 2012

(86) PCT No.: PCT/CN2012/079686
§ 371 (c)(1),
(2), (4) Date: Feb. 3, 2015

(87) PCT Pub. No.: WO2014/019237
PCT Pub. Date: Feb. 6, 2014

(65) Prior Publication Data
US 2015/0222396 A1 Aug. 6, 2015

(51) Int. Cl.
*H04L 1/00* (2006.01)
*H04L 1/18* (2006.01)
*H04L 5/14* (2006.01)

(52) U.S. Cl.
CPC ........... *H04L 1/1887* (2013.01); *H04L 1/1812* (2013.01); *H04L 5/1469* (2013.01)

(58) Field of Classification Search
CPC ............ H04Q 11/04; H04Q 11/05; H04L 5/14
(Continued)

(56) References Cited

U.S. PATENT DOCUMENTS

2007/0109988 A1   5/2007  Sampath ................. 370/321
2011/0211503 A1*  9/2011  Che ....................... H04L 5/0005
                                                           370/280
(Continued)

FOREIGN PATENT DOCUMENTS

CN   101946448 A   1/2011
CN   102468949 A   5/2012
(Continued)

OTHER PUBLICATIONS

3GPP TS 36.211 V10.5.0 (Jun. 2012), "$3^{rd}$ Generation Partnership Project; Technical Specification Group Radio Access Network; Evolved Universal Terrestrial Radio Access (E-UTRA); Physical Channels and Modulation (Release 10)", 101 pgs.
(Continued)

*Primary Examiner* — Dady Chery
(74) *Attorney, Agent, or Firm* — Harrington & Smith (57) ABSTRACT

The present invention provides a method, apparatus and a program relating to an enhanced TDD UL HARQ timeline for UL-DL coexistence scenario. The present invention includes transmitting data in a first transmission, receiving acknowledgement information for Hybrid Automatic Repeat-Request pursuant to uplink-downlink configurations 0 or 6 in Time-Division-Duplex mode for LTE, determining the timing of a second transmission associated with a process for HARQ and transmitting data in a second transmission in the subframe according to the determined timing, wherein a second transmission associated with a process for Hybrid Automatic Repeat-Request is performed in a protected subframe if the first transmission associated with said process is performed in a protected subframe.

17 Claims, 10 Drawing Sheets

(58) Field of Classification Search
USPC .......................................... 370/280, 293, 294
See application file for complete search history.

(56) References Cited

U.S. PATENT DOCUMENTS

| | | | | |
|---|---|---|---|---|
| 2013/0114573 A1* | 5/2013 | Suzuki | .................. | H04L 1/1887 370/336 |
| 2013/0188533 A1* | 7/2013 | He | ........................ | H04J 3/1605 370/280 |

FOREIGN PATENT DOCUMENTS

| | | | |
|---|---|---|---|
| CN | 102468959 A | 5/2012 | |
| CN | 102480348 A | 5/2012 | |

OTHER PUBLICATIONS

3GPP TS 36.213 V10.4.0 (Dec. 2011), "3$^{rd}$ Generation Partnership Project; Technical Specification Group Radio Access Network; Evolved Universal Terrestrial Radio Access (E-UTRA); Physical layer procedures (Release 10)", 125 pgs.

* cited by examiner

Fig. 1

| Sub-frame | D | S | U | U | U | D | S | U | U | U | D | S | U | U | U | D | S | U | U | U |
|---|---|---|---|---|---|---|---|---|---|---|---|---|---|---|---|---|---|---|---|---|
| HARQ channel ID | | | 1 | 2 | 3 | | | 4 | 5 | 6 | | | 7 | 1 | 2 | | | 4 | 5 | 6 |

Fig. 2

| Macro | Pico | Pico HARQ ID |
|---|---|---|
| D | D | |
| S | S | |
| U | U | 1 ← New transmission |
| D | U | 2 |
| D | D | 3 |
| D | D | |
| S | S | |
| U | U | 4 |
| D | U | 5 |
| D | D | 6 |
| D | D | |
| S | S | |
| U | U | 7 |
| D | U | 1 ← Re-transmission |
| D | U | 2 |
| D | D | |
| S | S | |
| U | U | 3 |
| D | U | 4 |
| D | U | 5 |

Fig. 3

| Macro | Pico | Pico HARQ ID |
|---|---|---|
| D | D |  |
| U | U | 1 | ← New transmission
| D | U | 2 |
| D | U | 3 |
| D | D |  |
| S | S |  |
| U | U | 4 |
| D | U | 5 |
| D | U | 6 |
| D | D |  |
| S | S |  |
| U | U | 1 | ← Re-transmission
| D | U | 7 |
| D | U | 2 |
| D | D |  |
| S | S |  |
| U | U | 4 |
| D | U | 3 |
| D | U | 5 |
| D | D |  |
| S | S |  |
| U | U | 1 |
| D | U | 6 |
| D | U | 7 |

Fig. 4

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Fig. 5

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 10 | 11 | 14 | | | 10 | 11 | 14 |
| 6 | | | 10 | 11 | 14 | | | 10 | 15 | |

Fig. 6

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | $I_{PHICH}=0: 4$ $I_{PHICH}=1: 8$ | 6 | | | | $I_{PHICH}=0: 4$ $I_{PHICH}=1: 8$ | 6 | | | |
| 6 | 8 | 6 | | | | 8 | 6 | | | 5 |

Fig. 7

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 6 | | | 4 | 6 | 6 | | | 4 | 7 | |

ENHANCED TDD UL HARQ TIMELINE FOR UL-DL COEXISTENCE SCENARIO

FIELD OF THE INVENTION

The present invention relates to an enhanced TDD UL HARQ timeline for UL-DL coexistence scenario.

BACKGROUND OF THE INVENTION

In LTE (Long Term Evolution) release 11, LTE_TD-D_eIMTA (TDD: Time Divison Duplex; eIMTA: enhanced Interference Management Traffic Adaptation) is studied targeting on the efficient adaptation of TDD UL/DL (Uplink/Downlink) configuration to better match different UL/DL traffic load, in which UL-DL coexistence will be unavoidable, and UL-DL interference will be a big challenge.

Different cells may have different TDD UL/DL configurations depending on its UL/DL traffic load, so one UE (User Equipment) may experience quite different interference from neighbor cells in different TDD sub-frames. For example, in UL direction, one UE may suffer low inter-cell interference in one sub-frame from UEs (UL to UL interference case) in the neighbor cells, but may suffer quite high inter-cell interference (DL to UL interference case) from a neighbour eNB in another sub-frame.

Figure 1:
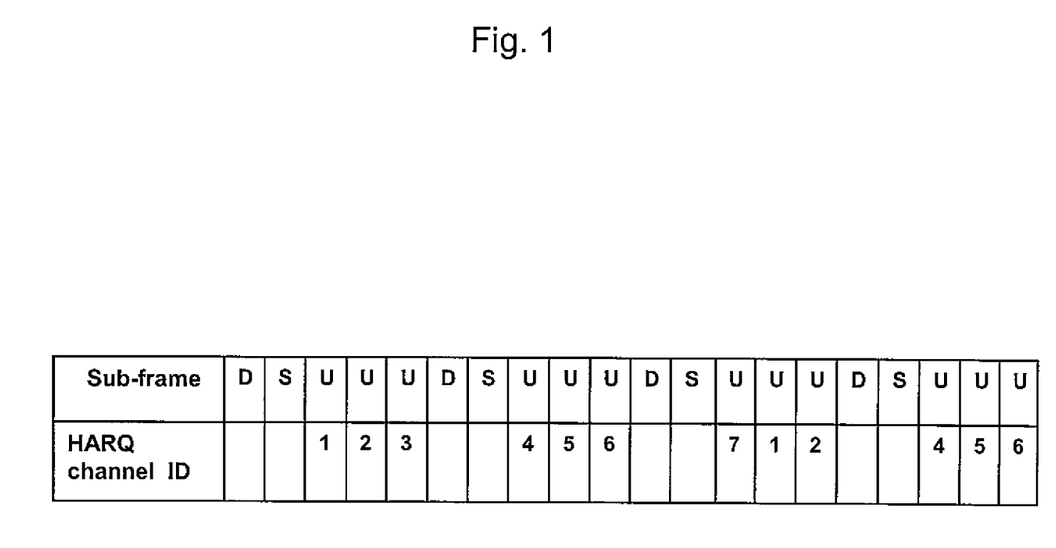
FIG. 1 is a table showing an example of a DSUUU configuration and the traditional HARQ timeline.

For TDD LTE, fixed HARQ (Hybrid Automatic Repeat Request) timeline has been specified for different TDD UL/DL configurations depending on the specific TDD frame structures. An example for a DSUUU configuration (uplink-downlink configuration 0 in FIG. 4) is shown in FIG. 1. In FIG. 1, U denotes a subframe for UL transmission, D denotes a subframe for DL transmission and S denotes a special subframe comprising a switch-point for changing the transmission direction.

When considering the UL HARQ process for LTE_TD-D_eIMTA, if the traditional HARQ timeline is used for the UL-DL coexistence scenarios, one problem is that the new transmission packet and the retransmission packet may have a quite different SINR (Signal to Interference plus Noise Ratio). This is because HARQ timeline for UL in LTE is synchronous and anew transmission packet associated with HARQ ID 1 may be transmitted in UL in the pico cell for instance in subframe 2 in parallel with UL data in the macro cell, while the next retransmission for HARQ ID 1 in UL in the pico cell takes place in subframe 3 in parallel with DL data transmission in the macro cell, as shown in FIG. 2.

Usually, a retransmission has the same MCS (Modulation and Coding Scheme) as a new transmission (such as chase combining), or similar MCS as a new transmission (such as IR (Incremental Redundancy) method). Hence, if the SINR difference between transmission and retransmission is too high, there will be either unnecessary energy redundancy when the retransmission has a much higher SINR than the transmission or there will be a helpless retransmission when the retransmission has much lower SINR than the transmission and it is hard to recover the signals.

One common understanding in current eIMTA studies is that subframe #0/1/2 and subframe #5/6/7 are fixed as D-S-U to protect transmission of important control signaling, at least for a 5 ms UL-DL switching period. For protected sub-frames it is ensured that all cells in the network configure the same type D, S or U for data transmission carried out in a protected sub-frame. The first transmission for HARQ ID 1 in the pico cell in the scenario depicted in FIG. 2 will therefore experience interference only from UL transmissions in neighboring cells.

Figure 2:
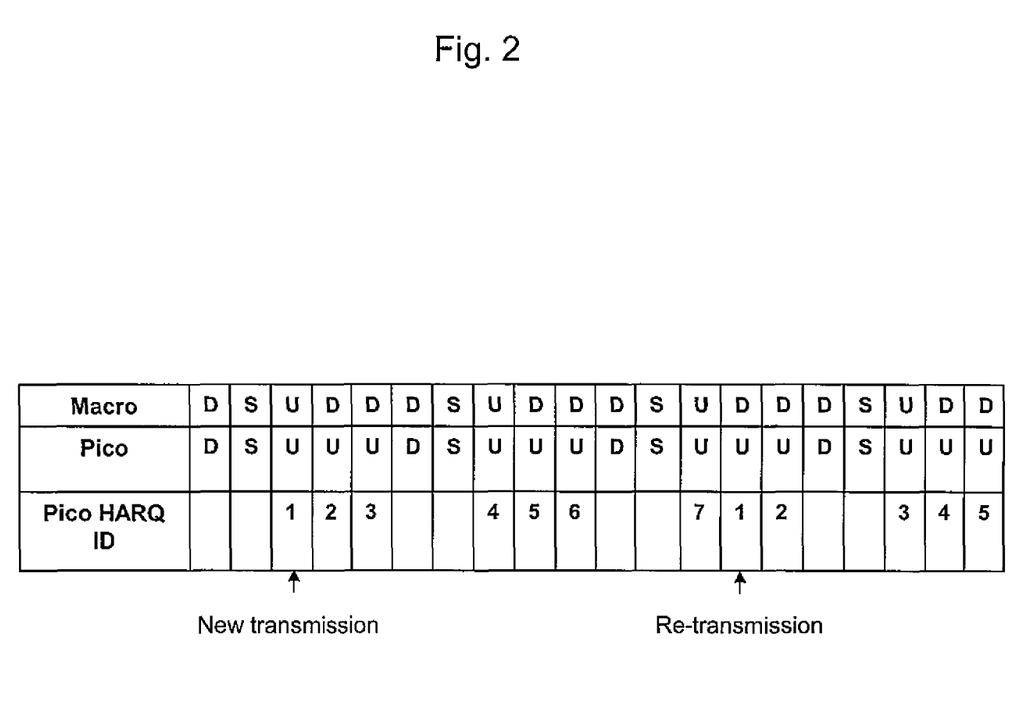
FIG. 2 is a table showing an example in which subframe a retransmission packet is transmitted in a UL-DL coexisted between uplink-downlink configuration 2 in Macro and uplink-downlink configuration 0 in Pico for the traditional HARQ timeline.

However, one should note that this agreement is not sufficient for protecting the retransmissions for HARQ ID 1 in the pico cell in the scenario of FIG. 2. Although the first transmission occurs in the protected sub-frame 2 the second (re)transmission takes place in the unprotected sub-frame 3 in parallel with DL data transmission in the macro cell, even though both packets are related to the same control signaling.

REFERENCES

TS 36.211, 3rd Generation Partnership Project; Technical Specification Group Radio Access Network; Evolved Universal Terrestrial Radio Access (E-UTRA); Physical Channels and Modulation (Release 10); V10.5.0 (2012-06).

TS 36.213, 3rd Generation Partnership Project; Technical Specification Group Radio Access Network; Evolved Universal Terrestrial Radio Access (E-UTRA); Physical layer procedures (Release 10); V10.4.0 (2011-12).

SUMMARY OF THE INVENTION

According to the present invention, there are provided a method, apparatus and a program for an enhanced TDD UL HARQ timeline for UL-DL coexistence scenario.

According to an aspect of the present invention, there is provided a method comprising:

transmitting data in a first transmission, receiving acknowledgement information for Hybrid Automatic Repeat-Request pursuant to uplink-downlink configurations 0 or 6 in Time-Division-Duplex mode for LTE, determining the timing of a second transmission associated with a process for HARQ and transmitting data in a second transmission in the subframe according to the determined timing, wherein a second transmission associated with a process for Hybrid Automatic Repeat-Request is performed in a protected subframe if the first transmission associated with said process is performed in a protected subframe.

According to another aspect of the present invention, there is provided an apparatus comprising:

a receiver/transmitter configured to communicate with at least another apparatus, a memory configured to store computer program code, and a processor configured to cause the apparatus to perform:

transmitting data in a first transmission, receiving acknowledgement information for Hybrid Automatic Repeat-Request pursuant to uplink-downlink configurations 0 or 6 in Time-Division-Duplex mode for LTE, determining the timing of a second transmission with a process for HARQ and transmitting data in a second transmission in the subframe according to the determined timing, wherein a second transmission associated with a process for Hybrid Automatic Repeat-Request is performed in a protected subframe if the first transmission associated with said process is performed in a protected subframe.

According to further refinements as defined under the above aspects the second transmission associated with a process for Hybrid Automatic Repeat-Request is performed in a unprotected subframe if the first transmission associated with said process is performed in a unprotected subframe;

the timing is determined such that the subframe of the first transmission and the subframe of the second transmission have the same type of interference from transmissions in neighboring network elements;

the type of interference is one of downlink-to-downlink interference, uplink-to-uplink interference, uplink-to-downlink interference and downlink-to-uplink interference;

the timing of the second transmission is determined based on the time that elapses between the first transmission and the acknowledgement information for Hybrid Automatic Repeat-Request, and the time elapses between the acknowledgement information for Hybrid Automatic Repeat-Request and the second transmission;

the subframe of the second transmission is determined based on an UL grant message indicative of the successful or unsuccessful detection of the first transmission at the receiving end;

a Hybrid Automatic Repeat-Request process index is added to the uplink grant.

According to another aspect of the present invention, there is provided a method, comprising:

receiving data in a first transmission associated with a process for Hybrid Automatic Repeat-Request, determining the timing of the acknowledgement information for Hybrid Automatic Repeat-Request pursuant to uplink-downlink configurations 0 or 6 in Time-Division-Duplex mode for LTE transmitting acknowledgement information for Hybrid Automatic Repeat-Request according to the determined timing in response to the first transmission, wherein the timing of the acknowledgement information for Hybrid Automatic Repeat-Request is determined such that a second transmission associated with said process for Hybrid Automatic Repeat-Request is performed in a protected subframe if the first transmission is performed in a protected subframe.

According to further refinements as defined under the above aspect, the timing of the acknowledgement information for Hybrid Automatic Repeat-Request is determined such that a second transmission associated with said process for Hybrid Automatic Repeat-Request is performed in an unprotected subframe if the first transmission is performed in an unprotected subframe;

the timing is determined such that the subframe of the first transmission and the subframe of the second transmission have the same type of interference from transmissions in neighboring network elements;

the type of interference is one of downlink-to-downlink interference, uplink-to-uplink interference, uplink-to-downlink interference and downlink-to-uplink interference;

the timing of the second transmission is determined based on the time that elapses between the first transmission and the acknowledgement information for Hybrid Automatic Repeat-Request, and the time that elapses between the acknowledgement information for Hybrid Automatic Repeat-Request and the second transmission;

the acknowledgement information for Hybrid Automatic Repeat-Request is conveyed in an uplink grant message indicative of the successful or unsuccessful detection of the first transmission;

a Hybrid Automatic Repeat-Request process index is added to the uplink grant.

According to another aspect of the present invention, there is provided an apparatus comprising a receiver/transmitter configured to communicate with at least another apparatus, a memory configured to store computer program code, and a processor configured to cause the apparatus to perform:

receiving data in a first transmission associated with a process for Hybrid Automatic Repeat-Request, determining the timing of the acknowledgement information for Hybrid Automatic Repeat-Request pursuant to uplink-downlink configurations 0 or 6 in Time-Division-Duplex mode for LTE transmitting acknowledgement information for Hybrid Automatic Repeat-Request according to the determined timing in response to the first transmission, wherein the timing of the acknowledgement information for Hybrid Automatic Repeat-Request is determined such that a second transmission associated with said process for Hybrid Automatic Repeat-Request is performed in a protected subframe if the first transmission is performed in a protected subframe.

According to further refinements as defined under the above aspect the timing of the acknowledgement information for Hybrid Automatic Repeat-Request is determined such that a second transmission associated with said process for Hybrid Automatic Repeat-Request is performed in an unprotected subframe if the first transmission is performed in an unprotected subframe;

the processor is configured to cause the apparatus to further perform determining the timing such that the subframe of the first transmission and the subframe of the second transmission have the same type of interference from transmissions in neighboring network elements;

the type of interference is one of downlink-to-downlink interference, uplink-to-uplink interference, uplink-to-downlink interference and downlink-to-uplink interference;

the timing of the second transmission is determined based on the time that elapses between the first transmission and the acknowledgement information for Hybrid Automatic Repeat-Request, and the time that elapses between the acknowledgement information for Hybrid Automatic Repeat-Request and the second transmission;

the processor is further configured to convey the acknowledgement information for Hybrid Automatic Repeat-Request in an uplink grant message indicative of the successful or unsuccessful detection of the first transmission;

a Hybrid Automatic Repeat-Request process index is added to the uplink grant.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION

In the following, aspects/embodiments of the present invention are described by referring to general and specific examples of the aspects/embodiments, wherein the features of the aspects/embodiments can be freely combined with each other unless otherwise described. It is to be understood, however, that the description is given by way of example only, and that the described aspects/embodiments are by no means to be understood as limiting the present invention thereto.

In order overcome the above described problems, according to an aspect of the present invention, there is proposed a new HARQ timeline for DL-UL coexistence scenario in TDD LTE.

According to an aspect of the present invention, it is for example assumed that subframe #2 and subframe #7 are protected UL subframes where only UL-to-UL interference is present.

That is, the idea according to an aspect of the present invention is to make the transmission and retransmission happen in the same type of interference case (interference case here distinguishes ensured UL-UL or DL-DL transmission in neighboring cells during protected subframes from transmissions, and in unprotected subframes without ensured transmit direction in neighboring cells, which may be UL-UL or DL-DL, but may also be UL-DL or DL-UL), so that transmission and retransmissions of HARQ channels associated with protected subframes experience most likely the same or at least similar SINR.

Figure 3:
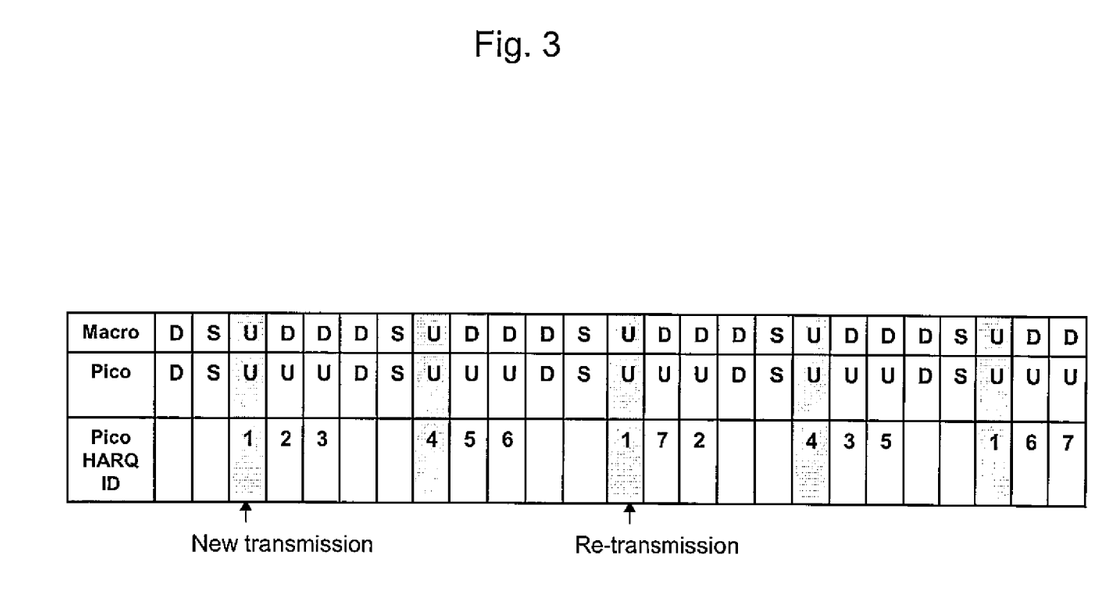
FIG. 3 is a table showing an example of the designed HARQ process for the case of DSUDD (uplink-downlink configuration 2) and DSUUU (uplink-downlink configuration 0) coexisted case according to an aspect of the present invention.

One example of the designed HARQ process for the DSUDD and DSUUU (the same scenario as already shown in FIG. 2 for the traditional HARQ timeline) is shown in FIG. 3.

As indicated in FIG. 3, a total of 7 HARQ channels for the pico cell are configured with DSUUU. FIG. 3 shows the HARQ processes for the pico cell and configuration DSUUU when the new HARQ timeline is applied in the pica cell. For HARQ channel ID 1 and 4 associated with protected UL subframes 2 and 7, the transmission and retransmission will now both happen in the UL-UL interference case for protected subframes different to HARQ channel ID 2, 3, 5, 6, and 7.

The merit of the above solution is that it ensures the same or at least similar SINR for all transmissions of the HARQ processes associated with protected subframes but can still preserve synchronous HARQ processing in UL. Synchronous HARQ allows for ACK/NACK signaling on PHICH (Physical Hybrid Automatic Repeat Request Indicator Channel). The new HARQ timeline does therefore not need signaling on PDCCH (Physical Downlink Control Channel) for UL HARQ which would significantly increase the signaling load on PDCCH and the blind detection effort in UE required for identifying relevant control information on PDCCH.

It is noted that the above proposal is not limited to the configuration described above but is also applicable when other TDD uplink-downlink configurations are used in the macro cell.

Figure 4:
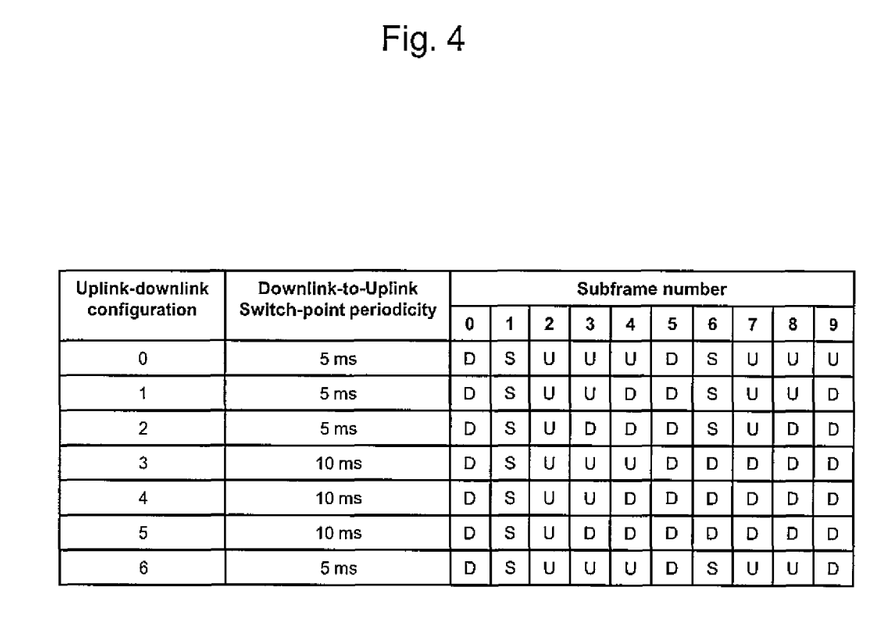
FIG. 4 is a table showing an example of TDD UL/DL configurations.

The PUSCH (Physical Uplink Shared Channel) RTTs (Round Trip Times) for most of current TDD configurations are 10 ms, in which case the initial transmission and the retransmission will be in the same type of subframes (in terms of interference). Two problematic configurations are configuration 0 (DSUUU-DSUUU) and configuration 6 (DSUUU-DSUUD), as shown in FIG. 4 (cf. Table 4.2-2 of document TS 36.211).

The proposed new timelines can be summarized as follows: for PUSCH transmissions scheduled in subframe n, a UE shall schedule the same HARQ process at subframe n+k_RTT, where k_RTT is defined in the table shown in FIG. 5, which can be split into two separate tables similar to Table 8-2 and Table 9.1.2-1 in document TS 36.213.

Figure 5:
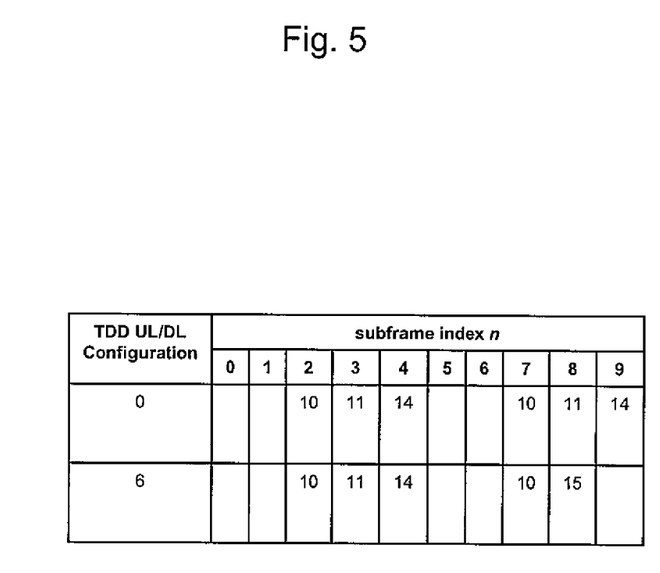
FIG. 5 is a table indicating examples of values of parameter k_RTT for TDD configurations 0 and 6 according to an aspect of the present invention.

The table shown in FIG. 5 indicates the time k_RTT for configuration 0 and 6 which elapses between a PUSCH transmission in subframe n and the next PUSCH transmission for the associated HARQ process in n+k_RTT.

Figure 6:
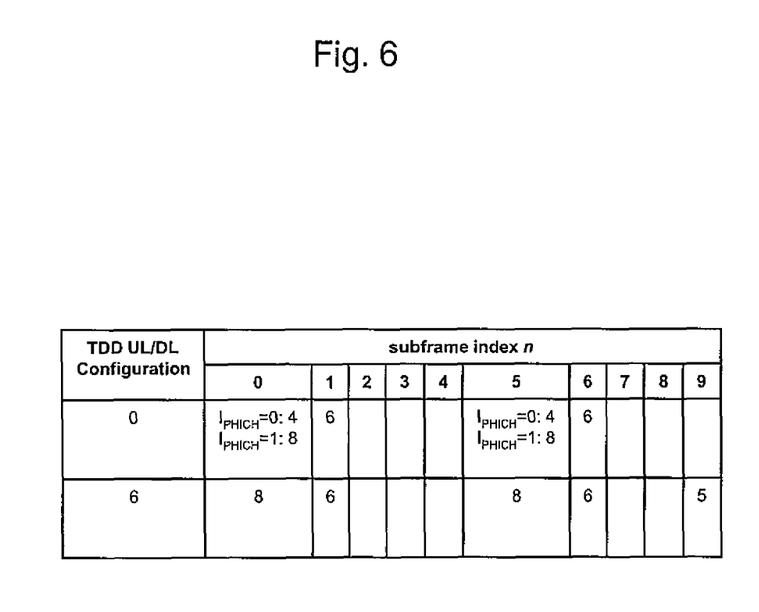
FIG. 6 is a table indicating examples of values of parameter k for TDD configurations 0 and 6 according to an aspect of the present invention.

The table shown in FIG. 6 (which is a modification to table 8-2 in TS 36.213) indicates the time k for configuration 0 and 6, which elapses between an UL grant for PUSCH detected by the UE on PDCCH or an ACK/NACK message detected by the UE on PHICH in subframe n and the corresponding PUSCH transmission by the UE in subframe n+k.

The index I_PHICH=0, if the previous PUSCH transmission of the associated HARQ process occurred in subframes 3 or 8.

The index I_PHICH=1, if the previous PUSCH transmission of the associated HARQ process occurred in subframes 4 or 9.

Figure 7:
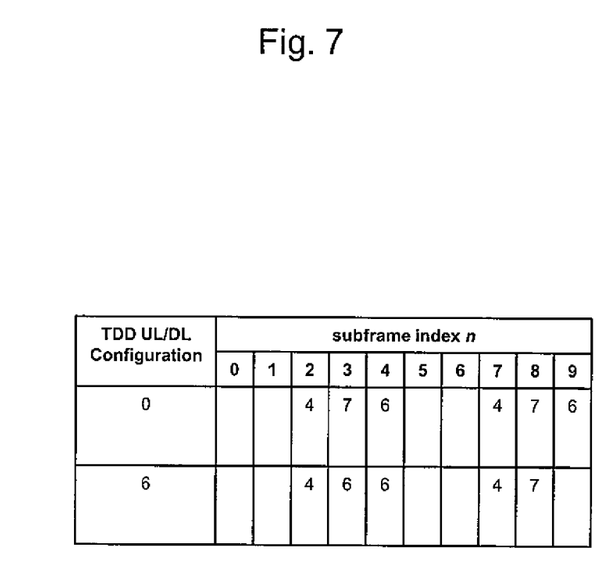
FIG. 7 is a table indicating examples of parameter k_PHICH for TDD configurations 0 and 6 according to an aspect of the present invention.

The table shown in FIG. 7 (which corresponds to table 9.1.2-1 in TS 36.213) indicates the time k_PHICH for configurations 0 and 6 which elapses between a PUSCH transmission by the UE in a subframe n and the corresponding ACK/NACK message on PHICH in subframe n+k_PHICH.

The iterative evaluation of the tables shown in FIGS. 6 and 7 results in the round trip time k_RTT given in table shown in FIG. 5, as derivable from the following example. The following example however, merely serves for illustration is not intended to limit the present invention.

$n = 3$                d0 on PUSCH in UL => k_PHICH = 7

$n = 10 = 3 + 7$    ACK/NAK for d0 in DL => Subframe 0, I_PHICH = 0

=> $k = 4$ $n = 14 = 10 + 4$   d1 on PUSCH in UL => k_PHICH = 6

$n = 20 = 14 + 6$   ACK/NAK for d1 in DL => Subframe 0, I_PHICH = 1

=> $k = 8$ $n = 28 = 20 + 8$   d2 on PUSCH in UL => k_PHICH = 7

$n = 35 = 28 + 7$   ACK/NAK for d2 in DL => Subframe 5, I_PHICH = 0

=> $k = 4$ $n = 39 = 35 + 4$   d3 on PUSCH in UL => k_PHICH = 6

$n = 45 = 39 + 6$   ACK/NAK for d3 in DL => Subframe 5, I_PHICH = 1

=> $k = 8$ $n = 53 = 45 + 8$   d4 on PUSCH in UL

...

$$k\_RTT\ (d0, d1) = 14 - 3 = 11,$$
$$k\_RTT(d1, d2) = 28 - 14 = 14,$$
$$k\_RTT\ (d2, d3) = 39 - 28 = 11,$$
$$k\_RTT(d4, d3) = 53 - 39 = 14$$

According to the above described example, the first transmission d0 occurs in subframe 3, which is an unprotected UL subframe, as derivable from FIG. 3.

It is common understanding in eITMA that subframes 2 and 7 are protected UL subframes (that is, all cells in the area will use subframes 2 and 7 for UL transmission, no matter of the configured UL/DL configuration of the cells), and the remaining subframes 3, 4, 8 and 9 are unprotected UL subframes.

According to the aspect of the present invention, it is ensured that an initial HARQ transmission and related retransmissions always occur in the same type of UL subframe which is either "protected" or "unprotected".

Hence, since the first transmission d0 occurs in subframe 3, which is an unprotected subframe in the above example, respective retransmissions d1, d2 and d3 for d0 occur only in unprotected subframes 4, 8 and 9.

Thus, as can be seen from the table shown in FIG. 7, if n=3, k_PHICH=7.

Then, the ACK/NAK for d0 in DL occurs in subframe n=3+7=10, which corresponds to subframe 0. Thus, since d0 in PUSCH occurred in subframe 3, I_PHICH=0. Thus, k=4, as derivable from the table shown in FIG. 6.

Then, transmission d1 occurs in subframe 4 (corresponding to n=14=10+4). According to the table shown in FIG. 7, for subframe 4, k_PHICH=6.

Then, the ACK/NAK for d1 in DL occurs in subframe 14+6=20, which corresponds to subframe 0. Thus, since d1 in PUSCH occurred in subframe 4, I_PHICH=1, and thus, k=8, as derivable from the table shown in FIG. 6.

Further, transmission d2 occurs in subframe 8 (corresponding to n=28=20+8). According to the table shown in FIG. 7, for subframe 8, k_PHICH=7.

Then, the ACK/NAK for d2 in DL occurs in subframe 28+7=35, which corresponds to subframe 5. Thus, since d2 in PUSCH occurred in subframe 8, I_PHICH=0, and thus, k=4, as derivable from the table shown in FIG. 6.

Then, the round trip time k_RTT (d0, d1) between first transmission d0 and the retransmission d1 is 14−3=11. Further, k_RTT (d1, d2)=28−14=14, k_RTT(d2, d3)=39−28=11, and so on.

These results are indicated in the table shown in FIG. 5.

Thus, as already described above, for PUSCH transmissions scheduled in subframe n, a UE shall schedule the same HARQ process at subframe n+k_RTT, where k_RTT is defined in the table shown in FIG. 5. That is, the subframe for second transmission is determined based on the index of the subframe of the first transmission. The time that elapses between the first and second transmission is the round trip time as shown in FIG. 5, and it composes 2 parts: the time that elapses between the first transmission and the HARQ acknowledgment shown in FIG. 6, and the time that elapses between the HARQ acknowledgment and the second transmission shown in FIG. 7, i.e. k_RTT=k+k_PHICH.

Secondly, according to another aspect of the present invention, it is proposed to support asynchronous HARQ in UL, and to enable transmission and retransmission happen in the same type of interference sub-frame (type of interference sub-frame means the normal UL-UL/DL-DL sub-frame or UL-DL coexisted sub-frame) by PDCCH UL grant indication.

According to this aspect of the invention, the table shown in FIG. 6 indicates the time k for configuration 0 and 6, which may elapse between an UL grant detected by the UE on PDCCH and the corresponding PUSCH transmission by the UE in subframe n. Re-transmission in UL can only be scheduled by UL grant.

The remaining scheme of this aspect may be similar to the aspect described above with regard to (re)transmission on PUSCH.

With UL asynchronous HARQ, what is needed to ensure transmission and retransmission happen in the same type of interference sub-frame (type of interference sub-frame means the normal UL-UL/DL-DL sub-frame or UL-DL coexisted sub-frame) is to transmit UL grant for the retransmission in proper DL subframes.

Figure 8:
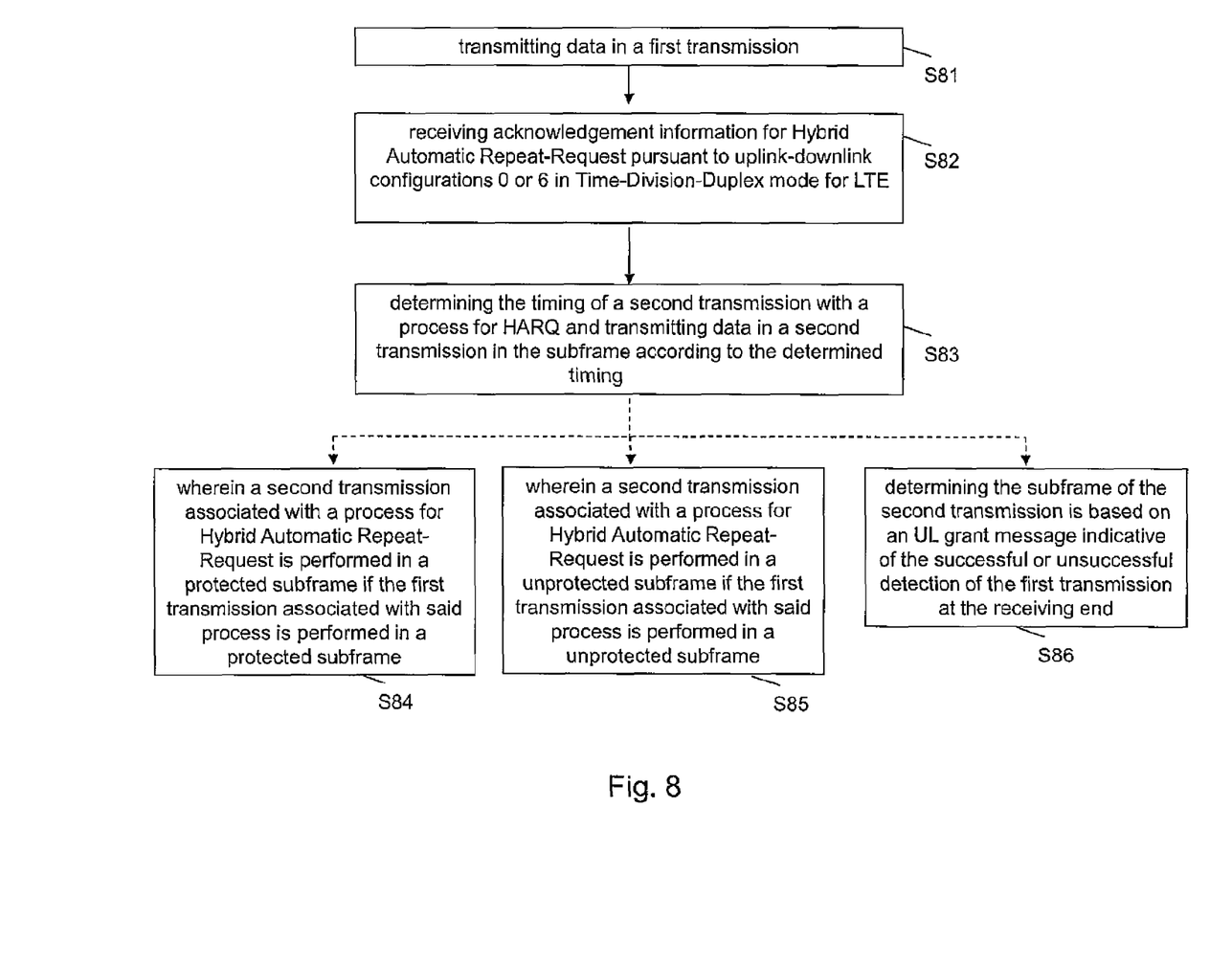
FIG. 8 is a flowchart illustrating a method according to certain aspects of the present invention.

FIG. 8 is a flowchart illustrating processing of the apparatus according to certain embodiments of the present invention.

According to an embodiment of the present invention, first, in a step S81, the apparatus, i.e. a network element, transmits data in a first transmission, and then in a step S82, receives acknowledgement information for Hybrid Automatic Repeat-Request pursuant to uplink-downlink configurations 0 or 6 in Time-Division-Duplex mode for LTE. In a step S83, the network element determines the timing of a second transmission associated with a process for HARQ and transmitting data in a second transmission in the subframe according to the determined timing.

If the first transmission associated with said process is performed in a protected subframe, the second transmission associated with a process for Hybrid Automatic Repeat-Request is performed in a protected subframe in a step S84.

If the first transmission associated with said process is performed in a unprotected subframe, the second transmission associated with a process for Hybrid Automatic Repeat-Request is performed in a unprotected subframe in a step S85.

According to an further aspect, in step S86, the subframe of the second transmission is determined based on an UL grant message indicative of the successful or unsuccessful detection of the first transmission at the receiving end.

According to another aspect, a Hybrid Automatic Repeat-Request process index is added to the uplink grant.

According to certain aspects of the invention, the timing is determined such that the subframe of the first transmission and the subframe of the second transmission have the same type of interference from transmissions in neighboring network elements.

According to further aspects of the present invention, the type of interference is one of downlink-to-downlink interference, uplink-to-uplink interference, uplink-to-downlink interference and downlink-to-uplink interference.

According to still further aspects of the present invention, the timing of the second transmission is determined based on the time that elapses between the first transmission and the acknowledgement information for Hybrid Automatic Repeat-Request, and the time elapses between the acknowledgement information for Hybrid Automatic Repeat-Request and the second transmission.

Figure 9:
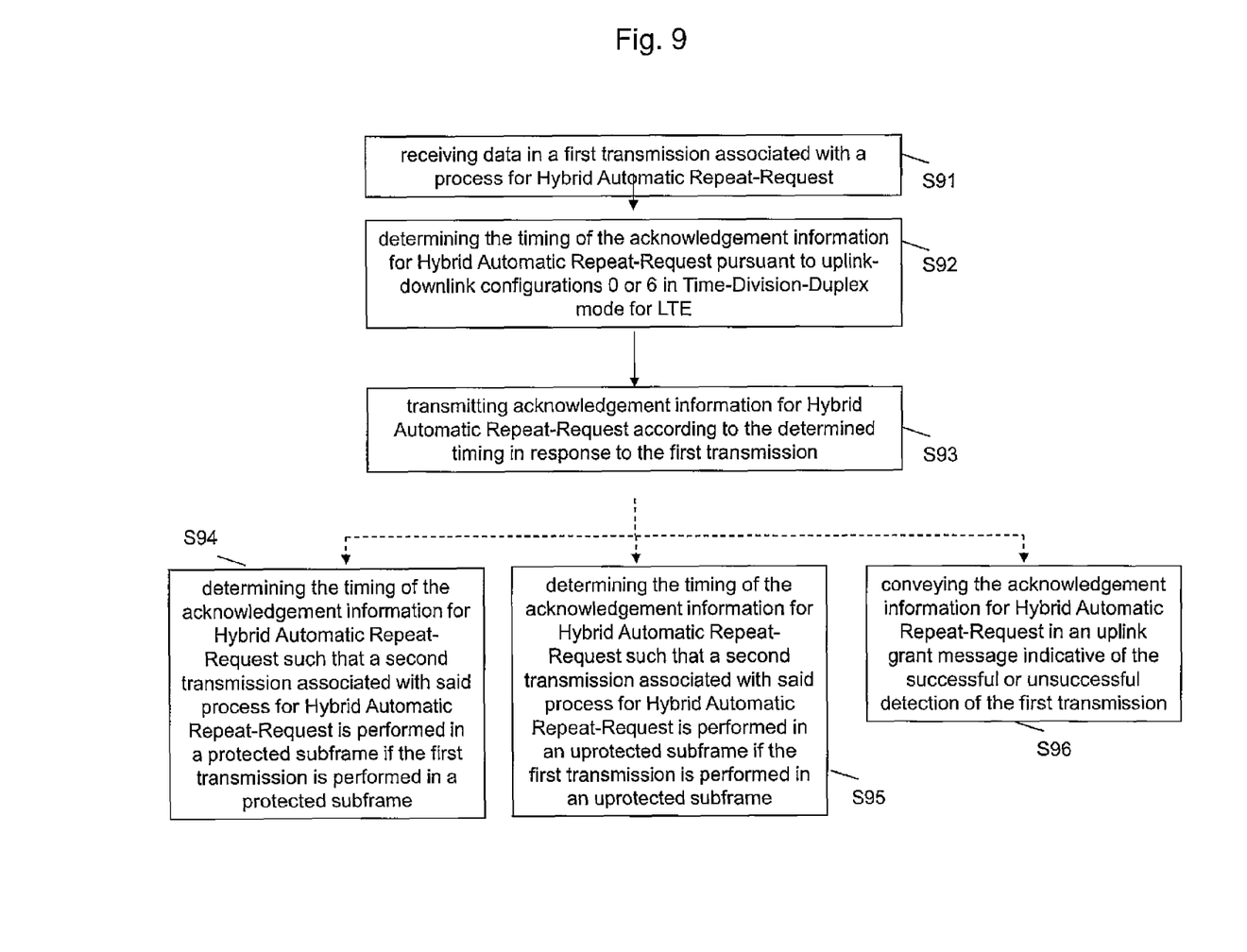
FIG. 9 is a flowchart illustrating another method according to certain aspects of the present invention.

FIG. 9 is a flowchart illustrating another processing of the apparatus according to certain embodiments of the present invention.

According to an embodiment of the present invention, first, in a step S91, the apparatus, i.e. a base station like an eNB, receives data in a first transmission associated with a process for Hybrid Automatic Repeat-Request, and then, in a step S92, determines the timing of the acknowledgement information for Hybrid Automatic Repeat-Request pursuant to uplink-downlink configurations 0 or 6 in Time-Division-Duplex mode for LTE. Then, the base station transmits acknowledgement information for Hybrid Automatic Repeat-Request according to the determined timing in response to the first transmission, in a step S93.

If the first transmission is performed in a protected subframe, in a step S94, the timing of the acknowledgement information for Hybrid Automatic Repeat-Request is determined such that a second transmission associated with said process for Hybrid Automatic Repeat-Request is performed in a protected subframe.

If the first transmission is performed in an unprotected subframe, in a step S95, the timing of the acknowledgement information for Hybrid Automatic Repeat-Request is determined such that a second transmission associated with said process for Hybrid Automatic Repeat-Request is performed in an unprotected subframe.

Further, the timing may be determined such that the subframe of the first transmission and the subframe of the second transmission have the same type of interference from transmissions in neighboring network elements.

The type of interference may be one of downlink-to-downlink interference, uplink-to-uplink interference, uplink-to-downlink interference and downlink-to-uplink interference.

Further, the timing of the second transmission may be determined based on the time that elapses between the first transmission and the acknowledgement information for Hybrid Automatic Repeat-Request, and the time that elapses between the acknowledgement information for Hybrid Automatic Repeat-Request and the second transmission.

According to a further aspect of the invention, the acknowledgement information for Hybrid Automatic Repeat-Request is conveyed in an uplink grant message indicative of the successful or unsuccessful detection of the first transmission in a step S96.

Further, a Hybrid Automatic Repeat-Request process index may be added to the uplink grant.

Figure 10:
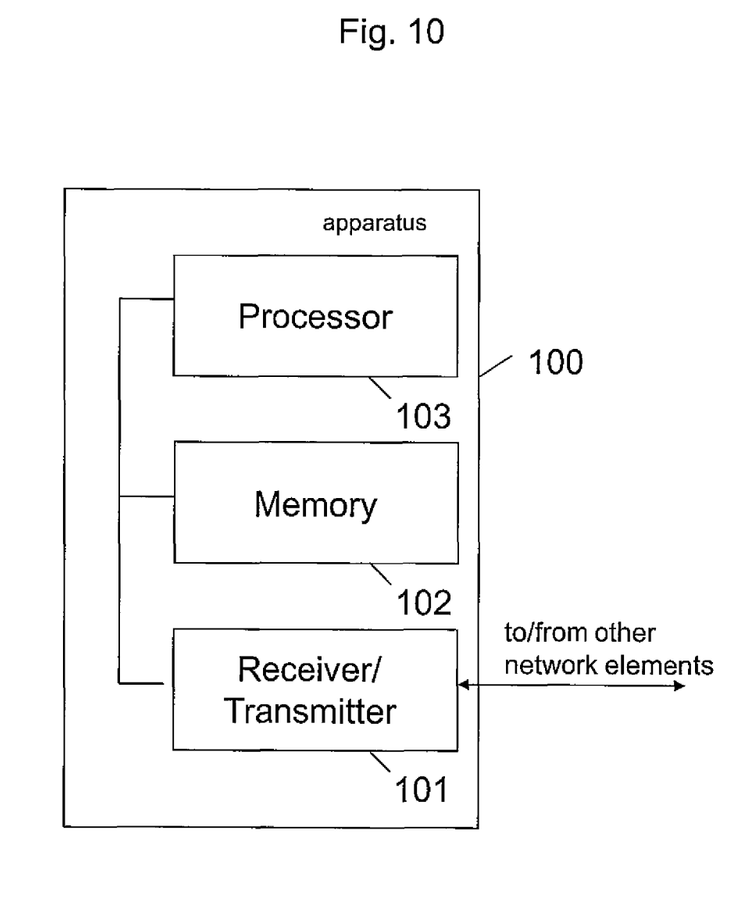
FIG. 10 is a block diagram showing an example of an apparatus according to certain aspects of the present invention.

FIG. 10 is a block diagram showing an example of an apparatus according to certain embodiments of the present invention.

As shown in FIG. 10, according to an aspect of the present invention, the apparatus 100, i.e. the network element, comprises a receiver/transmitter 101, a memory 102 and a processor 103. The receiver/transmitter 101 is configured to communicate with at least another apparatus in the network and to transmit and receive signals, the memory 102 is configured to store computer program code, and the processor 103 is configured to cause the apparatus to perform transmitting data in a first transmission, receiving acknowledgement information for Hybrid Automatic Repeat-Request pursuant to uplink-downlink configurations 0 or 6 in Time-Division-Duplex mode for LTE, determining the timing of a second transmission associated with a process for HARQ and transmitting data in a second transmission in the subframe according to the determined timing. If the first transmission associated with said process is performed in a protected subframe, the second transmission associated with a process for Hybrid Automatic Repeat-Request is performed in a protected subframe. If the first transmission associated with said process is performed in a unprotected subframe, the second transmission associated with a process for Hybrid Automatic Repeat-Request is performed in a unprotected subframe.

Further, the apparatus shown in FIG. 10 may be a base station like an eNB. Then, the receiver/transmitter 101 of the apparatus is configured to communicate with at least another apparatus in the network and to transmit and receive signals, the memory 102 is configured to store computer program code, and the processor 103 is configured to cause the apparatus to perform receiving data in a first transmission associated with a process for Hybrid Automatic Repeat-Request, determining the timing of the acknowledgement information for Hybrid Automatic Repeat-Request pursuant to uplink-downlink configurations 0 or 6 in Time-Division-Duplex mode for LTE, transmitting acknowledgement information for Hybrid Automatic Repeat-Request according to the determined timing in response to the first transmission, wherein the timing of the acknowledgement information for Hybrid Automatic Repeat-Request is determined such that a second transmission associated with said process for Hybrid Automatic Repeat-Request is performed in a protected subframe if the first transmission is performed in a protected subframe.

In the foregoing exemplary description of the apparatus, only the units that are relevant for understanding the principles of the invention have been described using functional blocks. The apparatus may comprise further units that are necessary for its respective operation. However, a description of these units is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus or processing device to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the embodiments and general and specific examples described above are provided for illustrative purposes only and are in no way intended that the present invention is restricted thereto. Rather, it is the intention that all variations and modifications which fall within the scope of the appended claims are covered.

What is claimed is:

1. A method, comprising:
   transmitting, by a network device, data in a first transmission;
   receiving, by the network device, acknowledgement information for Hybrid Automatic Repeat-Request pursuant to uplink-downlink subframe configurations 0 or 6 in Time-Division-Duplex mode for LTE;
   determining, by the network device, a subframe for a re-transmission of the data according to a process for Hybrid Automatic Repeat-Request, wherein the subframe for the re-transmission is determined such that interference from a neighboring cell is of a same type during the first transmission and during the re-transmission, wherein the type of interference comprises uplink or downlink interference; and
   transmitting, by the network device, said data in the re-transmission in the determined subframe,
   wherein, based on the determined subframe, the re-transmission associated with the process for Hybrid Automatic Repeat-Request is performed in a protected subframe if the first transmission associated with said process is performed in a protected subframe.

2. The method according to claim 1, wherein based on the determined subframe, the re-transmission associated with said process for Hybrid Automatic Repeat-Request is performed in an unprotected subframe if the first transmission associated with said process is performed in an unprotected subframe.

3. The method according to claim 1, wherein the subframe is determined such that the first transmission and the re-transmission will have a same signal to interference plus noise ratio.

4. The method according to claim 1, wherein the type of interference is based on one of downlink-to-downlink interference, uplink-to-uplink interference, uplink-to-downlink interference and downlink-to-uplink interference.

5. The method according to claim 1, wherein the subframe for the re-transmission is determined based on a time that elapses between the first transmission and the acknowledgement information for Hybrid Automatic Repeat-Request, and a time that elapses between the acknowledgement information for Hybrid Automatic Repeat-Request and the re-transmission.

6. The method according to claim 1, wherein:
the subframe for the re-transmission is determined based on an uplink grant message indicative of a successful or unsuccessful detection of the first transmission at a receiving end.

7. The method according to claim 6, wherein a Hybrid Automatic Repeat-Request process index is added to the uplink grant.

8. A computer program product comprising a non-transitory computer-readable storage medium bearing computer program code embodied therein for use with a computer, the computer program code comprising code executed by a processor to perform the method of claim 1.

9. An apparatus comprising:
at least one processor; and
at least one memory including computer program code, the at least one memory and the computer program code configured, with the at least one processor, to cause the apparatus to perform at least the following:
to transmit data in a first transmission;
to receive acknowledgement information for Hybrid Automatic Repeat-Request pursuant to uplink-downlink subframe configurations 0 or 6 in Time-Division-Duplex mode for LTE; and
to determine a subframe for a re-transmission of the data according to a process for Hybrid Automatic Repeat-Request, wherein the subframe for the re-transmission is determined such that interference from a neighboring cell is of a same type during the first transmission and during the re-transmission, wherein the type of interference comprises uplink or downlink interference; and
to transmit data in the re-transmission in the subframe,
wherein, based on the determined subframe, the re-transmission associated with the process for Hybrid Automatic Repeat-Request is performed in a protected subframe if the first transmission associated with said process is performed in a protected subframe.

10. A method, comprising:
receiving data in a first transmission associated with a process for Hybrid Automatic Repeat-Request;
determining timing of acknowledgement information for Hybrid Automatic Repeat-Request pursuant to uplink-downlink subframe configurations 0 or 6 in Time-Division-Duplex mode for LTE; and
transmitting acknowledgement information for Hybrid Automatic Repeat-Request according to the determined timing in response to the first transmission,
wherein the timing of the acknowledgement information for Hybrid Automatic Repeat-Request is determined such that interference from a neighboring cell is of a same type during the first transmission and during a re-transmission of the data, wherein the type of interference comprises uplink or downlink interference, and wherein the re-transmission is performed in a protected subframe if the first transmission is performed in a protected subframe.

11. The method according to claim 10, wherein
the timing of the acknowledgement information for Hybrid Automatic Repeat-Request is determined such that the re-transmission associated with said process for Hybrid Automatic Repeat-Request is performed in an uprotected subframe if the first transmission is performed in an uprotected subframe.

12. The method according to claim 10, wherein
the subframe is determined such that the first transmission and the re-transmission will have a same signal to interference plus noise ratio.

13. The method according to claim 10, wherein
the type of interference is based on one of downlink-to-downlink interference, uplink-to-uplink interference, uplink-to-downlink interference and downlink-to-uplink interference.

14. The method according to claim 10, wherein
the timing of the re-transmission is determined based on a time that elapses between the first transmission and the acknowledgement information for Hybrid Automatic Repeat-Request, and the time that elapses between the acknowledgement information for Hybrid Automatic Repeat-Request and the re-transmission.

15. The method according to claim 10, wherein:
the acknowledgement information for Hybrid Automatic Repeat-Request is conveyed in an uplink grant message indicative of a successful or unsuccessful detection of the first transmission.

16. The method according to claim 15, wherein
a Hybrid Automatic Repeat-Request process index is added to the uplink grant.

17. An apparatus comprising
at least one processor; and
at least one memory including computer program code, the at least one memory and the computer program code configured, with the at least one processor, to cause the apparatus to perform at least the following:
to receive data in a first transmission associated with a process for Hybrid Automatic Repeat-Request;
to determine the timing of the acknowledgement information for Hybrid Automatic Repeat-Request pursuant to uplink-downlink subframe configurations 0 or 6 in Time-Division-Duplex mode for LTE; and
to transmit acknowledgement information for Hybrid Automatic Repeat-Request according to the determined timing in response to the first transmission,
wherein the timing of the acknowledgement information for Hybrid Automatic Repeat-Request is determined such that interference from a neighboring cell is of a same type during the first transmission and during a re-transmission of the data, wherein the type of interference comprises uplink or downlink interference, and wherein the re-transmission is performed in a protected subframe if the first transmission is performed in a protected subframe.

* * * * *